US009534608B2

(12) United States Patent
Gehlot et al.

(10) Patent No.: US 9,534,608 B2
(45) Date of Patent: Jan. 3, 2017

(54) MULTI-STAGE AXIAL COMPRESSOR WITH COUNTER-ROTATION

(71) Applicant: Embry-Riddle Aeronautical University, Inc., Daytona Beach, FL (US)

(72) Inventors: Vinod Gehlot, Bangalore (IN); Magdy S. Attia, Ormond Beach, FL (US); Divyam Garg, Branchburg, NJ (US)

(73) Assignee: Embry-Riddle Aeronautical University, Inc., Daytona Beach, FL (US)

( * ) Notice: Subject to any disclaimer, the term of this patent is extended or adjusted under 35 U.S.C. 154(b) by 995 days.

(21) Appl. No.: 13/768,252

(22) Filed: Feb. 15, 2013

(65) Prior Publication Data

US 2013/0223984 A1 Aug. 29, 2013

Related U.S. Application Data

(60) Provisional application No. 61/600,002, filed on Feb. 17, 2012, provisional application No. 61/600,006, filed on Feb. 17, 2012.

(51) Int. Cl.
*F03D 7/02* (2006.01)
*F03D 7/04* (2006.01)
(Continued)

(52) U.S. Cl.
CPC ........... *F04D 19/024* (2013.01); *F04D 25/028* (2013.01); *F04D 29/644* (2013.01); *F05D 2260/40311* (2013.01); *Y10T 29/49321* (2015.01)

(58) Field of Classification Search
CPC .... F04D 19/024; F04D 19/026; F04D 25/028; F04D 29/644; Y10T 29/49321; F02K 3/072; F02C 3/067; F05D 2260/40311; F01D 1/24; F01D 1/26; F01D 25/16–25/168
See application file for complete search history.

(56) References Cited

U.S. PATENT DOCUMENTS 3,379,366 A 4/1968 Garnier
3,385,509 A 5/1968 Garnier
(Continued)

FOREIGN PATENT DOCUMENTS

GB 630277 A * 10/1949 ............. F01D 9/065

OTHER PUBLICATIONS

Mangtani, Amit, "Design and Development of a Multi-Stage Contra Rotating Mini Axial Compressor," Machinery & Equipment, Jun. 30, 2012.

*Primary Examiner* — Richard Edgar
*Assistant Examiner* — Jesse Prager
(74) *Attorney, Agent, or Firm* — Womble Carlyle Sandridge & Rice, LLP

(57) ABSTRACT

A multi-stage axial compressor incorporating a counter-rotational movement is provided with a series of rotors mounted along and driven by a driveshaft, and a geared counter-rotating outer casing. A planetary gear system is assembled along a static casing, which can be assembled as a forward or aft casing for the compressor. The bearings of the planetary gear system typically will be aligned concentrically with a center rotor drum assembly mounted along the single driveshaft. The counter-rotating drum assembly will be assembled over the rotor drum assembly and will be engaged by the forward and aft casings so as to provide for counter-rotation of selected ones of the rotors driven by the driveshaft of the compressor.

18 Claims, 12 Drawing Sheets

(51) Int. Cl.

| | |
|---|---|
| ***F04D 19/02*** | (2006.01) |
| ***F04D 29/64*** | (2006.01) |
| ***F04D 25/02*** | (2006.01) |

(56) References Cited

U.S. PATENT DOCUMENTS

| | | | | |
|---|---|---|---|---|
| 3,391,540 | A | 7/1968 | Bauger et al. | |
| 3,524,318 | A | 8/1970 | Bauger et al. | |
| 3,775,023 | A | 11/1973 | Davis et al. | |
| 4,159,624 | A | 7/1979 | Gruner | |
| 4,251,987 | A | 2/1981 | Adamson | |
| 4,463,553 | A | 8/1984 | Boudigues | |
| 5,010,729 | A | 4/1991 | Adamson et al. | |
| 6,450,766 | B1 * | 9/2002 | Honda | F01D 9/042 415/191 |
| 7,451,592 | B2 | 11/2008 | Taylor et al. | |
| 7,950,220 | B2 | 5/2011 | Merry et al. | |
| 7,966,806 | B2 | 6/2011 | Henry et al. | |
| 8,015,798 | B2 | 9/2011 | Norris et al. | |
| 8,061,968 | B2 | 11/2011 | Merry et al. | |
| 8,191,352 | B2 | 6/2012 | Schilling | |
| 8,375,695 | B2 * | 2/2013 | Schilling | F01D 15/10 310/114 |
| 2005/0172610 | A1 | 8/2005 | Bart et al. | |
| 2009/0090096 | A1 * | 4/2009 | Sheridan | F02C 7/36 60/226.3 |

* cited by examiner

MULTI-STAGE AXIAL COMPRESSOR WITH COUNTER-ROTATION

CROSS-REFERENCE TO RELATED APPLICATIONS

This application claims the benefit of U.S. Provisional Patent Application Ser. No. 61/600,002 filed on Feb. 17, 2012 and US. Provisional Patent Application Ser. No. 61/600,006 filed on Feb. 17, 2012. The specification and drawings of the provisional patent applications are specifically incorporated by reference herein.

FIELD OF THE INVENTION

Embodiments of the invention generally relate to axial compressors, and, more particularly, to axial compressors incorporating counter-rotating stages capable of being operated off a single driveshaft.

BACKGROUND

Axial compressors generally are designed to produce a substantially continuous flow of compressed gas or intake air passing therethrough to boost the power of gas turbine engines, such as jet engines for aircraft, high-speed ship engines, as well as some automotive reciprocating engines. In general, most axial compressors will include a series of airfoils, vanes or blades arranged in stages that include pairs of rotating and stationary airfoils. As an air flow enters the inlet of the compressor, the rotating airfoils (rotors) drive the air forwardly through the compressor, increasing the kinetic energy thereof, while the stationary or static airfoils (stators) diffuse the increased kinetic energy of the air flow passing thereover, causing a rise in pressure of the air flow. As a result, the pressure of the axial air flow through the compressor is significantly increased as it passes through multiple stages of the compressor.

However, the pressures and efficiencies provided by axial compressors can be limited by size and weight of the compressor. For example, in military jets where minimizing compressor size and weight is critical to provide a lower profile, higher stage pressure ratios generated by such smaller compressors typically are provided at the expense of reduced compressor efficiency, especially as airflow speeds approach high Mach numbers. Attempts have been made to design compressors with counter-rotation to try to increase the efficiency of axial compressors. The problem with such counter-rotating compressors has traditionally been that the blades of such counter-rotating compressors generally have been required to be on different driveshafts, which adds to the weight and complexity of the compressors, as well as potentially creating problems with synchronizing the operation of the counter-rotating blades, which further increases with an increased number of stages of the compressor.

SUMMARY

The embodiments disclosed are directed to axial compressors, and, more particularly, to axial compressors incorporating counter-rotating stages capable of being operated off a single driveshaft.

In one embodiment, a multi-stage axial compressor for counter rotation is provided. The axial compressor includes a driveshaft; a first series of rotor blade assemblies mounted on and rotating with the drive shaft, each rotor blade assembly comprising a rotating stage of the multi-stage axial compressor; and a second series of rotor blade assemblies mounted on the drive shaft, each rotor blade assembly comprising a counter-rotating stage of the multi-stage axial compressor and connected to the first series of rotor blade assemblies by at least one planetary gear assembly for causing counter-rotation of the second series of rotor blade assemblies.

In another embodiment, a multi-stage axial compressor for counter rotation and having stator vanes is provided. The axial compressor includes a driveshaft; a first series of rotor blade assemblies mounted on and rotating with the drive shaft, each rotor blade assembly comprising a rotating stage of the multi-stage axial compressor; a second series of rotor blade assemblies mounted on the drive shaft, each rotor blade assembly comprising a counter-rotating stage of the multi-stage axial compressor and connected to the first series of rotor blade assemblies by at least one planetary gear assembly for causing counter-rotation of the second series of rotor blade assemblies; and a series of stator vanes each stator vane arranged between a rotor blade assembly from the first series and a rotor blade assembly from the second series of rotating rotor blade assemblies.

In a further embodiment, a method is provided for assembling an axial compressor with counter-rotation of a plurality of rotor blade assemblies. A plurality of hubs is mounted over a compressor driveshaft between fore and aft mounting collars. A plurality of spaced apart rotating rotor blade assemblies is mounted on the plurality of hubs between the fore and aft mounting collars to form a compressor drum. A sun gear is mounted on the driveshaft at a fore end and at an aft end of the compressor drum, each sun gear including a series of inwardly facing keyed passages of locking recesses adapted to receive projecting locking members or keys of the fore and aft mounting collars. Forward and aft structural support casings are assembled, including at least one planetary gear assembly. The forward and aft structural support casings are mounted on the driveshaft with bearings being inserted between the forward and aft support casings and the fore and aft ends of the compressor drum. A plurality of counter-rotating rotor blade assemblies is mounted over the compressor drum, each counter rotating blade assembly including a series of rotor blade structures affixed to a counter-rotating case shell, the counter rotating blade assemblies being inserted between the spaced rotating rotor blade assemblies to form a center counter-rotating drum over the compressor drum. The counter-rotating drum is affixed to a fore rotor blade assembly and an aft rotor blade assembly to form an assembled counterrotating inner casing of the axial compressor. A static outer shroud is formed of the outer casing by assembling opposed outer static casing shells. The static outer shroud is mounted over the counter-rotating inner casing to complete the assembly of the axial compressor.

BRIEF DESCRIPTION OF THE DRAWINGS

These and other advantages and aspects of the embodiments of the disclosure will become apparent and more readily appreciated from the following detailed description of the embodiments taken in conjunction with the accompanying drawings, as follows.

DETAILED DESCRIPTION

The following detailed description is provided as an enabling teaching of several embodiments of the invention. Those skilled in the relevant art will recognize that many changes can be made to the embodiments described, while still obtaining the beneficial results. It will also be apparent that some of the desired benefits of the embodiments described can be obtained by selecting some of the features of the embodiments without utilizing other features. Accordingly, those who work in the art will recognize that many modifications and adaptations to the embodiments described are possible and may even be desirable in certain circumstances. Thus, the following description is provided as illustrative of the principles of the invention and not in limitation thereof, since the scope of the invention is defined by the claims.

Figure 1:
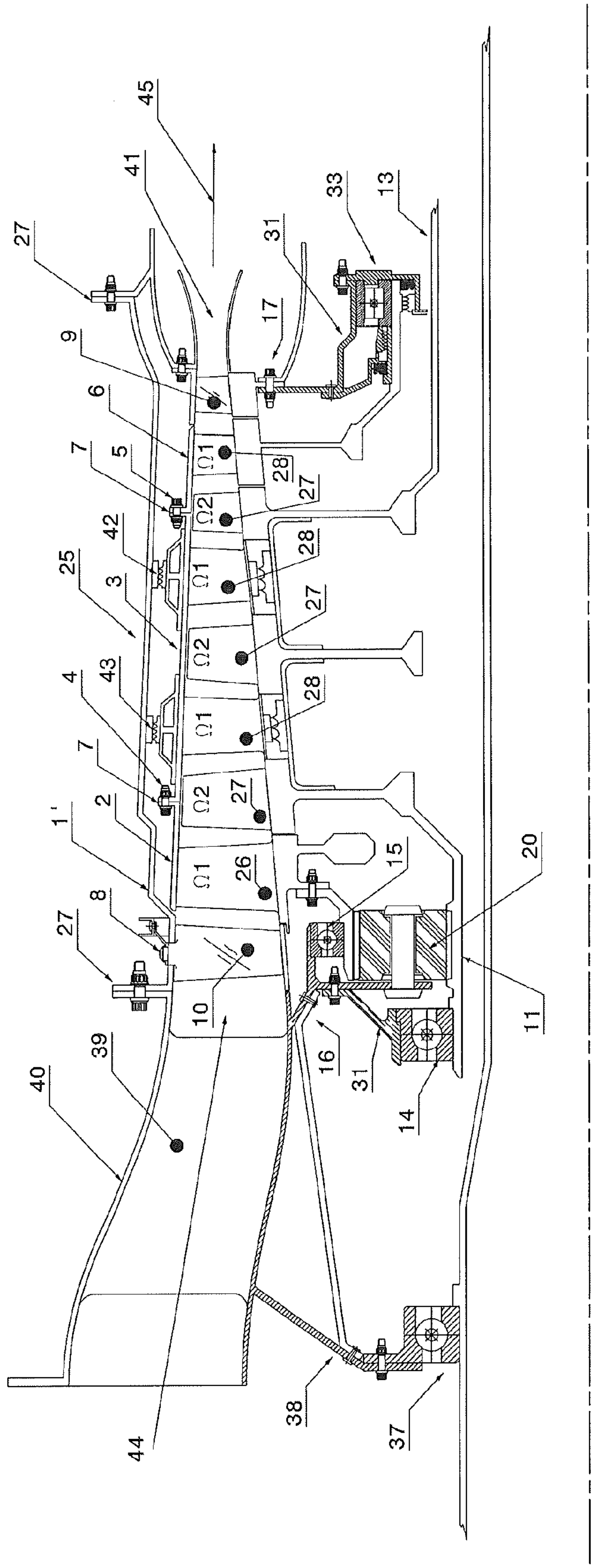
FIG. 1 is side elevational view, taken in cross section, of one embodiment of an N-stage axial compressor with counter-rotation utilizing a single transmission drive system.
Figure 2:
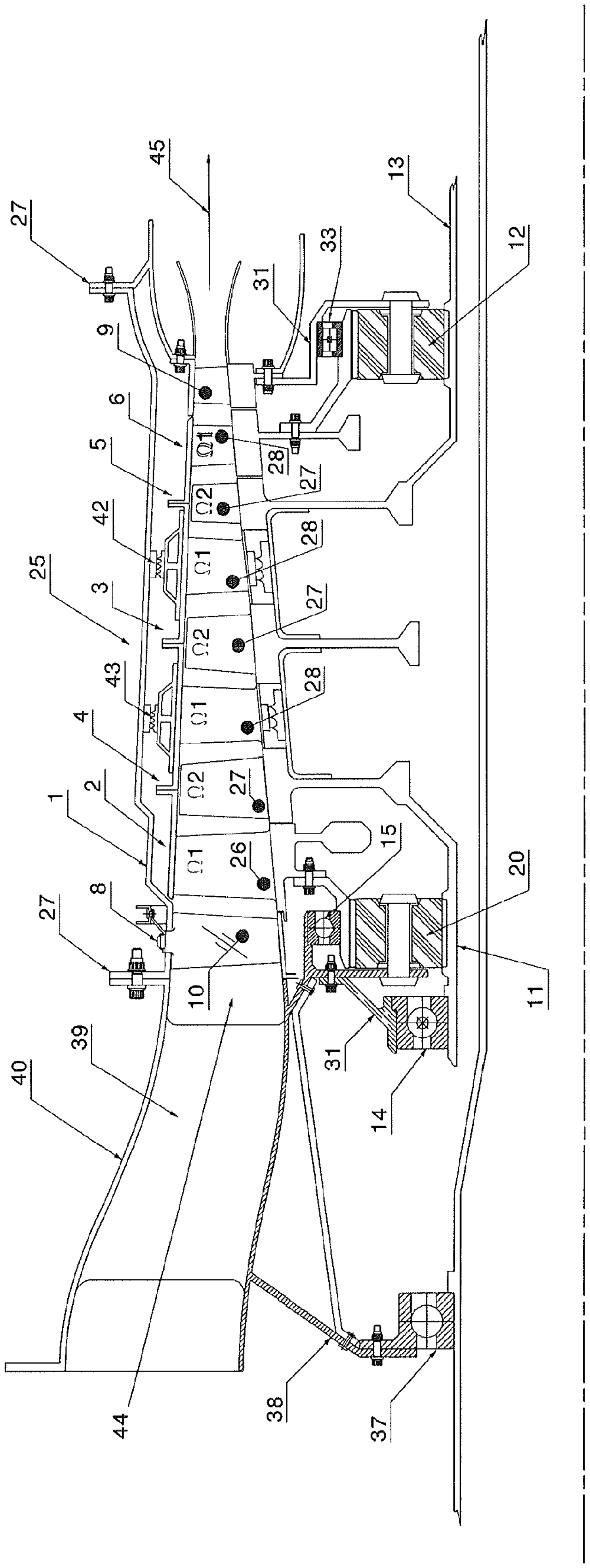
FIG. 2 is a side elevational view, taken in cross-section, illustrating another embodiment of the N-stage axial compressor with counter-rotation incorporating a dual transmission system for counter-rotation.

Referring now to the drawings in greater detail in which like numerals indicate like parts throughout the several views, FIGS. 1 and 2 generally illustrate exemplary embodiments of an N-stage axial compressor with counter-rotation. FIG. 1 illustrates a first embodiment of the axial compressor 1' including a first planetary gear system 11 for driving counter-rotation of selected ones of a series of rotor blade assemblies 26/28 indicated as including blades labeled Ω1 and Ω2 in FIGS. 1-2, with respect to a single main or primary driveshaft 13. FIG. 2 illustrates a second exemplary embodiment of the axial compressor 1 including first and second planetary gear assembly systems 11 and 12, designed to provide a dual drive transmission to the axial compressor. In both of the illustrated exemplary embodiments of the N-stage axial compressor, counter-rotation of selected ones of the rotor blade assemblies 26/28 is provided with all of the rotor blade assemblies, including the rotor blade assemblies being driven in a counter-rotation, being driven by a single driveshaft 13.

Figure 3:
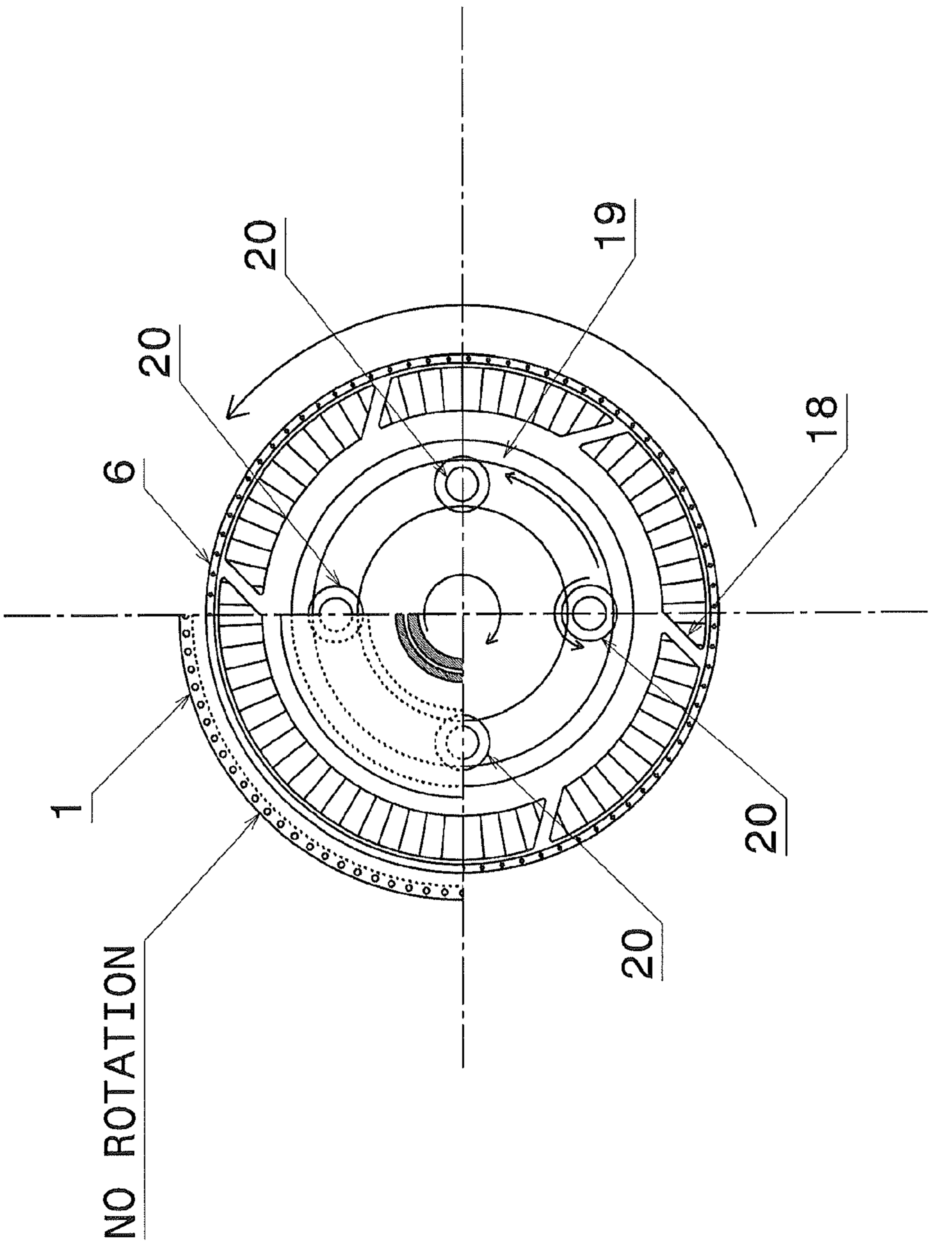
FIG. 3 is an end cross-sectional view of an axial compressor according to one embodiment.

As illustrated in FIGS. 1 and 2, the axial compressor 1/1' generally will include a rotating inner casing 6 that is connected to alternating ones of the rotor blade assemblies 3 such as by connectors, indicated at 4 and 5. The connectors can include various types of fasteners including bolts, rivets, etc., and further can comprise seals 7 on the outer sides of each of the fasteners 4 and 5, i.e., upstream of fastener 4 or downstream of fastener 5. The inner casing further is supported by fore and aft or inlet and outlet structural support casings 16 and 17 mounted adjacent inlet and outlet guide vanes 10 and 9 of the axial compressor 1, which are mounted at the upstream and downstream ends of an air flow path 44 extending through the axial compressor from an inlet 40 to a reduced diameter outlet 41. The structural support casings 16 and 17 can include single cast disks including a desired number, "N," of spokes 18 as shown in FIG. 3, and can be rotatably supported on the drive shaft 13 by a bearing assembly, as indicated at 15 in FIGS. 1-2. The structural support casings can include varying numbers of spokes, with there being five spokes 18 illustrated in FIG. 3 solely for purpose of illustration, and with it being understood by those skilled in the art that greater or fewer spokes also can be used. The spokes further can be aligned at substantially any degree of angle, and are shown in the example embodiment of FIG. 3 as being at a substantially 45° angle as will be understood by those skilled in the art.

Figure 9:
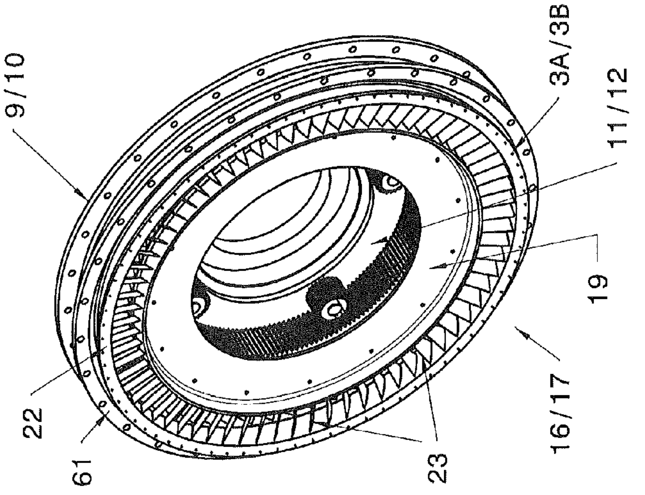
FIGS. 8 and 9 are perspective views schematically illustrating the assembly of planet gears to the static casing of the axial compressor in an exemplary embodiment.
Figure 8:
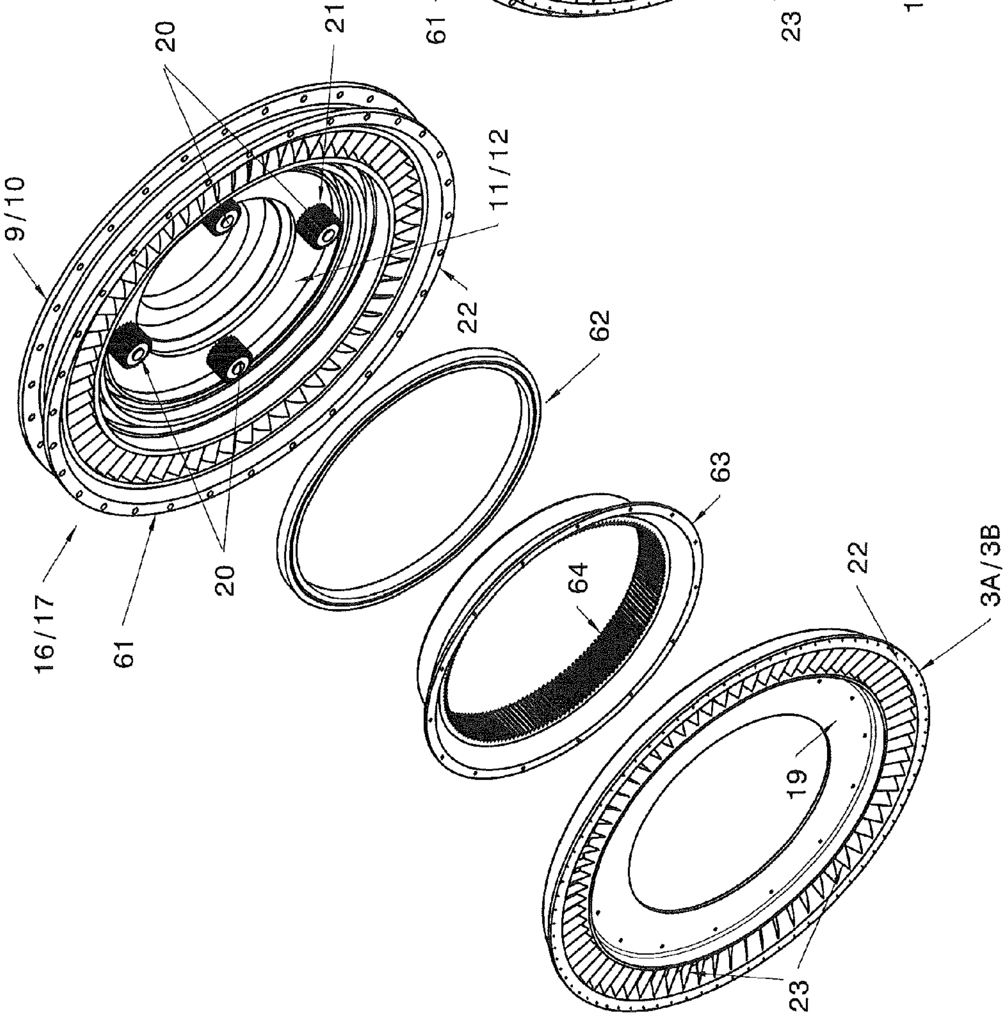

The spokes 18 generally can be cast with an outer support ring or frame 22, which can be connected to the inner casing 6 by fasteners such as rivets, bolts, etc., and terminate at an inner frame member 19 which connects to one of the planetary gear assemblies so as to be rotated by operation or rotation of the planetary gears as indicated in FIG. 3. In this embodiment, the inner frame member 19 generally will include a ring gear 63 either formed with or attached thereto for engaging the planetary gears 20 of the planetary gear assembly. Alternatively, the support disks, rather than being cast disks including a series of spokes, can comprise a series of air foil blades 23 mounted between inner and outer circular frame members, as illustrated in FIG. 8. In such embodiment, the inner frame member 19 of the support disk will be connected to the ring gear and spacer by fasteners (not shown), with the ring gear fitting over and engaging the gears 20 of the planetary gear assembly 11/12, as indicated in FIG. 9.

A stationary outer casing 25 will be provided over the rotating inner casing 6, covering and substantially sealing the inner casing therein. The outer casing generally includes stationary or fixed inlet guide vane 10 mounted at the inlet or upstream end 40 of the axial compressor 1, and a stationary or fixed in place outlet guide vane 9 mounted at the downstream or discharge end 41 of the flow path 44 of the compressor. The outer casing includes an outer shroud 26 which covers the rotating inner casing, with optional bearings 42 and 43 located therebetween to maintain the spacing between and support the stationary outer casing on the rotating inner casing. The outer shroud further is connected to the inlet and outlet guide vanes 10/9 such as by fastener assemblies as indicated at 27 in FIGS. 1 and 2. The stationary inlet and outlet guide vanes guide the inlet and outlet airflows 44/45 passing therethrough and further assist in passing a structural load of the outer casing to lower support members or legs 31 and 38. The support members of the outer casing are supported on the driveshaft 13, typically by bearing assemblies 14 and 33 which enable the rotation of the driveshaft while providing a load support for the outer casing, which forms the primary structure for holding the axial compressor in one piece and further provides attachment for connection to other engine components.

As further illustrated in FIGS. 4-7, a series of rotating/counter-rotating rotor blade assemblies or blisks 2 and 3 will be assembled and mounted on the driveshaft 13, with each of the rotor blade assemblies including a series or sets of air foil or rotor blades 35 mounted in spaced series about a hub or central frame member 36 adapted to fit over and be supported on the driveshaft 13 as indicated in FIGS. 4-7. Alternating ones of the rotor blade assemblies 2 can be affixed to the driveshaft so as to rotate with and in a direction of the rotation of the driveshaft 13, while the intervening ones of the rotor blade assemblies 3 can be connected to and adapted to rotate in the opposite direction with the counter-rotation of the inner casing. With the design of the axial compressor, there can be varying or "N" numbers of stages each including a rotating and a counter-rotating rotor blade assembly 2/3.

Figure 5:
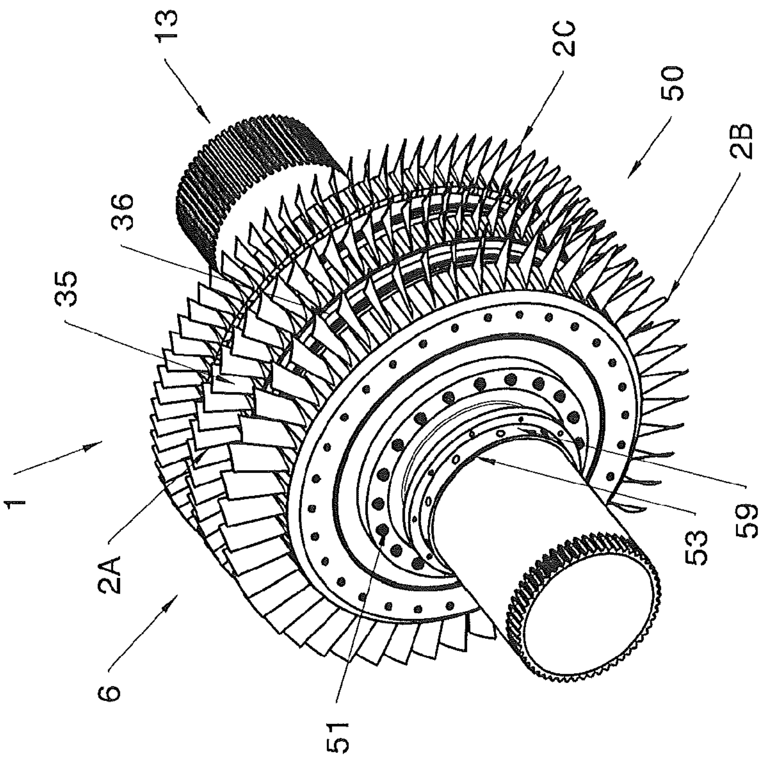
FIGS. 4-7 are perspective views schematically illustrating the assembly of a compressor drum of the axial compressor on the driveshaft of the compressor in an exemplary embodiment.
Figure 4:
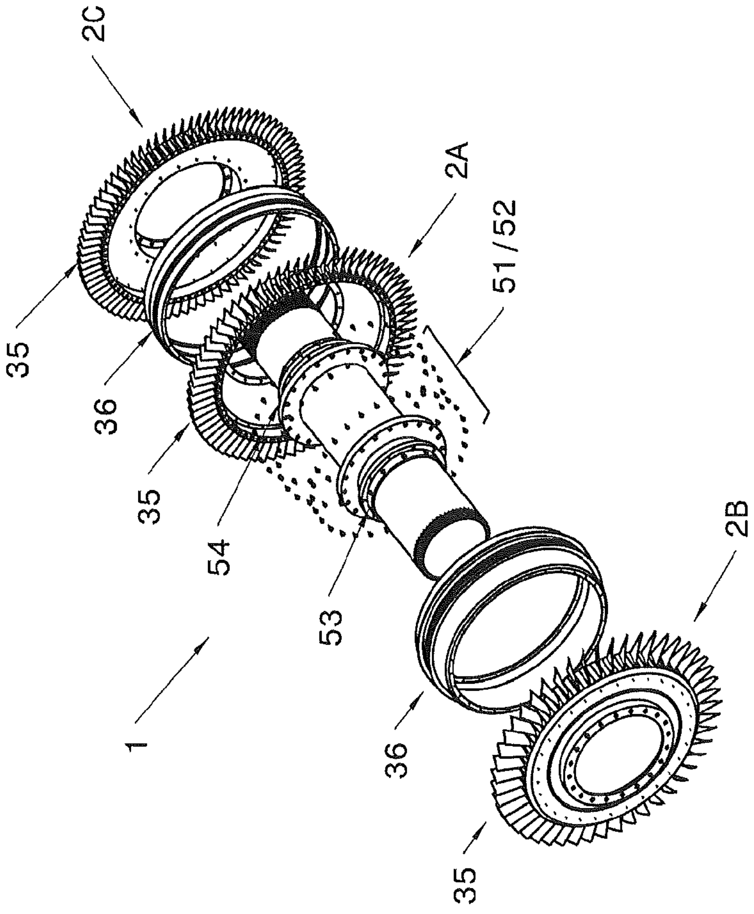
Figure 7:
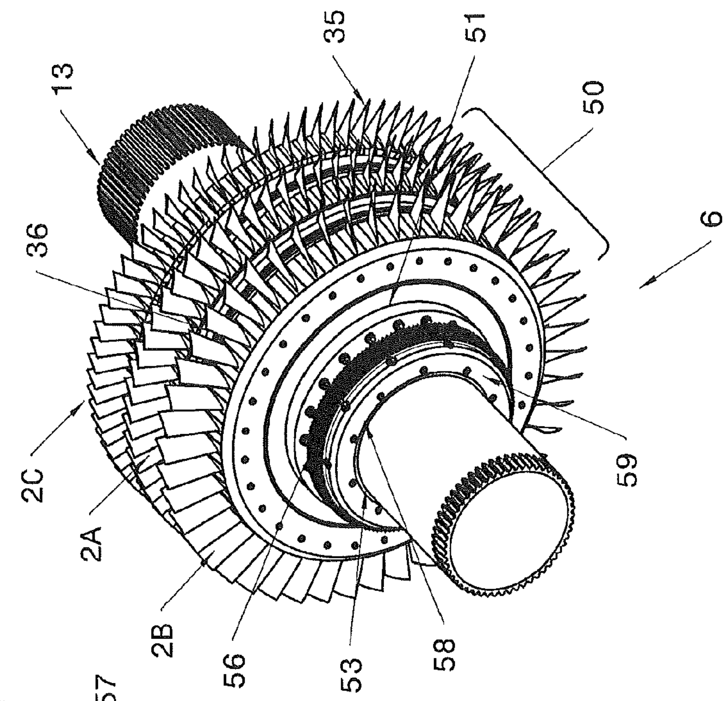
Figure 6:
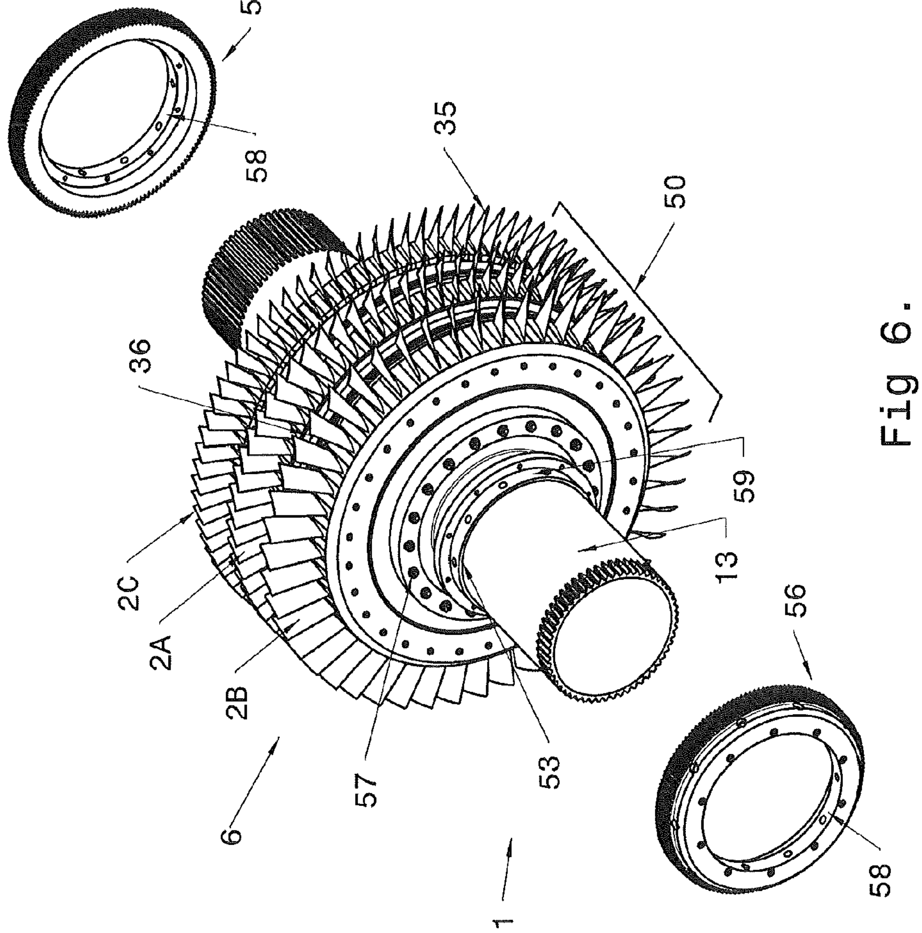

As illustrated in FIGS. 4-16, a series of the rotor blade assemblies 2 initially are assembled on the driveshaft 13. As stated above, while a series of three rotor blade assemblies 2A-2C are illustrated as being assembled on the driveshaft, it will be understood by those skilled in the art that greater or fewer numbers of rotor blade assemblies can be mounted on the main driveshaft 13 so as to define or make up the compressor drum 50 of the axial compressor 10 as illustrated in FIGS. 5 and 7. As indicated in FIG. 4, a center rotor blade assembly 2A can be mounted on fore and aft hubs 51 and 52 that are attached to the driveshaft 13 between fore and aft collars or supports 53 and 54, with fore and aft rotor blade assemblies 2B/2C further being fixed to the fore and aft collars so as to fixedly mount the rotor blade assemblies 2A-2C to the driveshaft. Once the rotor blade assemblies 2A-2C making up the compressor drum 50 of the axial compressor are assembled on the driveshaft, sun gears 56 and 57 generally will be mounted on the driveshaft at the upstream and downstream or fore and aft ends of the compressor drum as shown in FIG. 6. The sun gears 56 and 57 generally will include a series of inwardly facing keyed passages or locking recesses 58 adapted to receive projecting locking members or keys 59 of the fore and aft mounting collars to help secure the sun gears on the main driveshaft and to the fore and aft rotor blade assemblies 2B/2C of the compressor drum.

Figure 11:
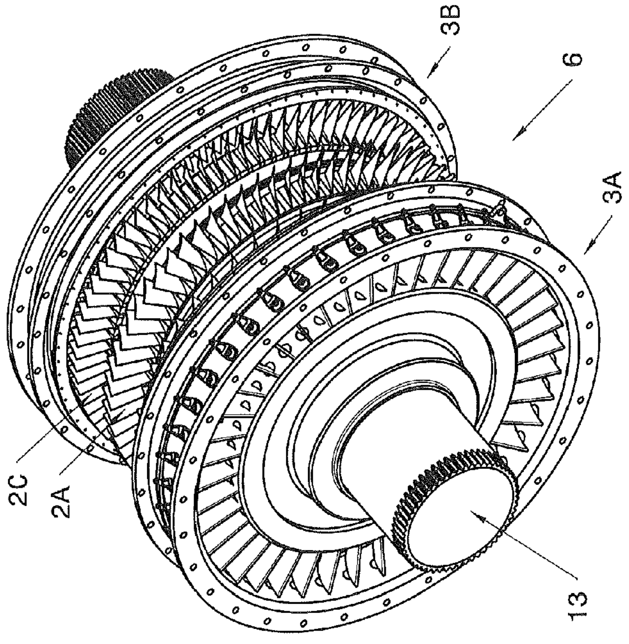
FIGS. 10 and 11 are perspective views schematically illustrating the assembly of the forward casing and the aft, static casing on the driveshaft, with the forward and aft casings being aligned concentrically with the rotor drum assembly mounted on the driveshaft in an exemplary embodiment.
Figure 10:
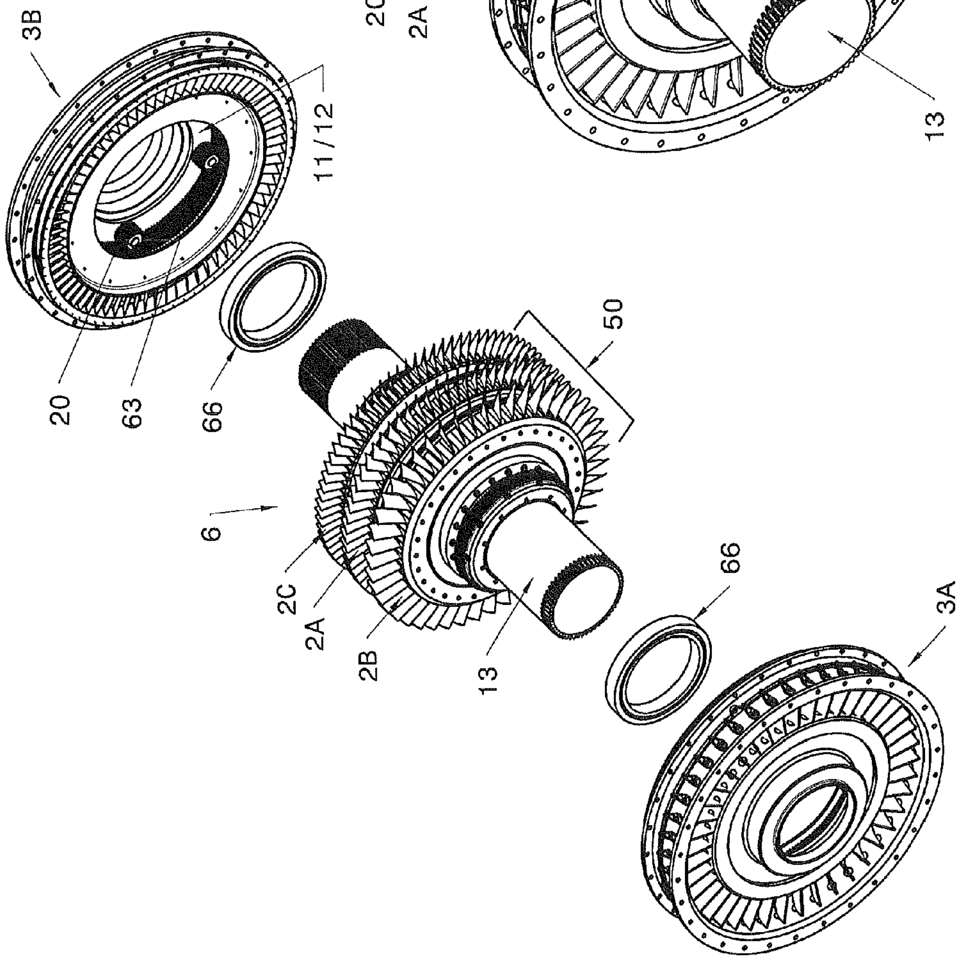
Figure 14:
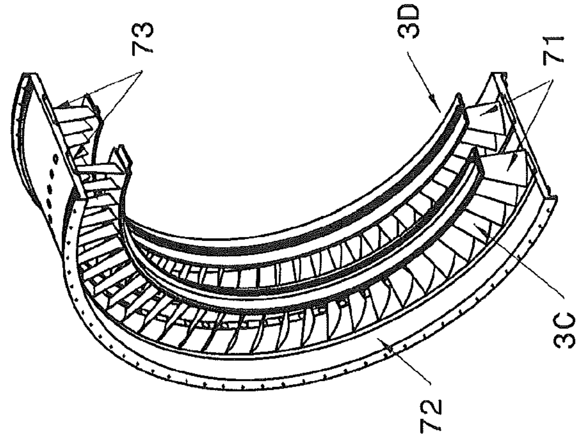
FIGS. 12-16 are perspective views illustrating the assembly of counter-rotating casings and center counter-rotating drum assembly formed by the mounting of the casings about the rotor drum assembly of the compressor in an exemplary embodiment.
Figure 13:
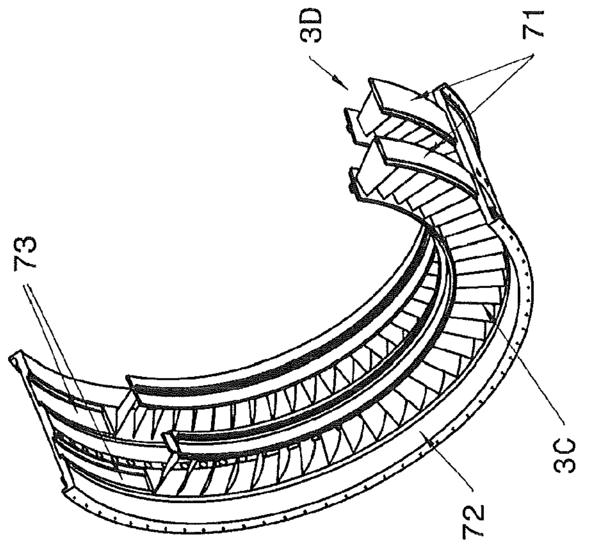
Figure 12:
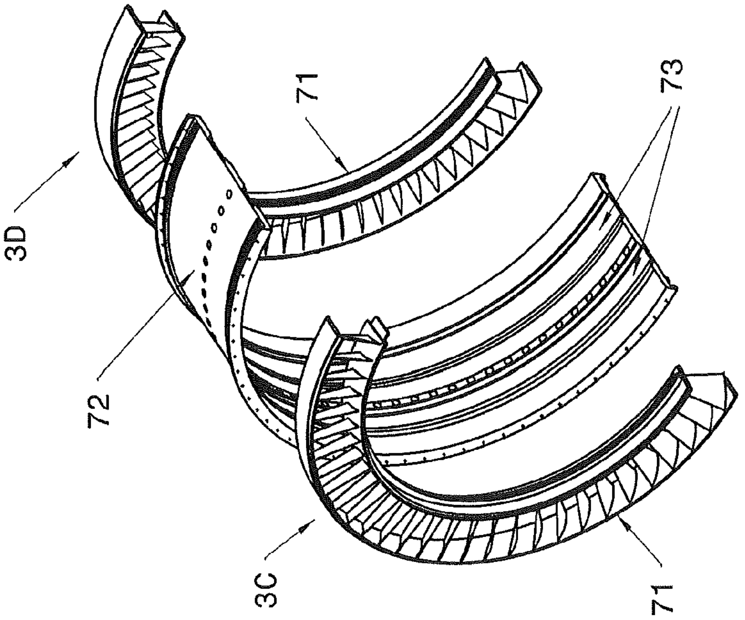
Figure 16:
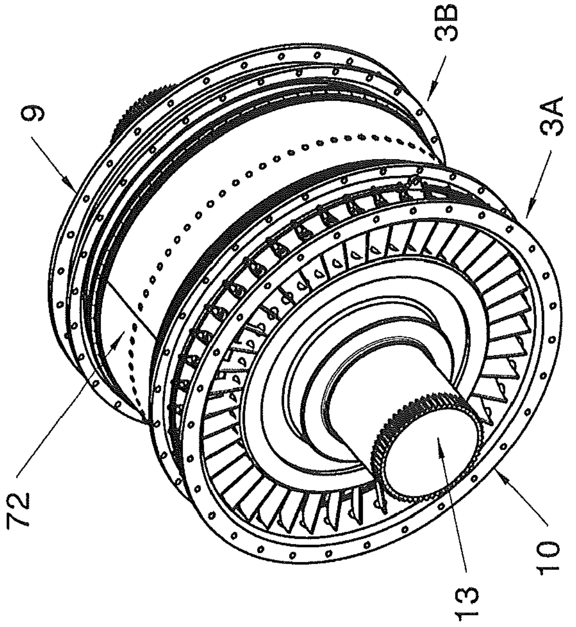

As previously noted, static and counter-rotating forward and aft structural support casings 16 and 17 thereafter are assembled, including one or more planetary gear assembly systems 11/12 for driving the counter rotation of the inner casing being mounted thereon, as illustrated in FIGS. 8 and 9. As an initial step, a series of planetary gears 20 is assembled to the static case 61 of the inlet or outlet guide vanes 10/9 after which a bearing 62 and ring gear 63 are assembled over the planetary gears 20, with the teeth 64 of the ring gear in operative engagement with the teeth 21 of the planetary gears. Thereafter, a counter-rotating blisk or rotor blade assembly 3A/3B of the counter-rotating inner case is aligned with and assembled onto each ring gear to complete the assembly of the forward and aft structural support casings 16/17 sections of the inner casing. Generally, as indicated in FIG. 8, each counter-rotating rotor blade assembly 3A-3C will have substantially the same construction as the rotor blade assemblies 2A-2C (FIGS. 4-7). As illustrated in FIGS. 10 and 11, the forward and aft structural support casings thereafter are received on the driveshaft 13, with bearings 66 being inserted between the forward and aft structural support casings 16/17 and the fore and aft ends of the compressor drum 50. The respective planetary gears 20 of the forward and aft structural support casings 16/17 are aligned with and engage the teeth of the sun gears mounted to the fore and aft ends of the compressor drum.

Figure 15:
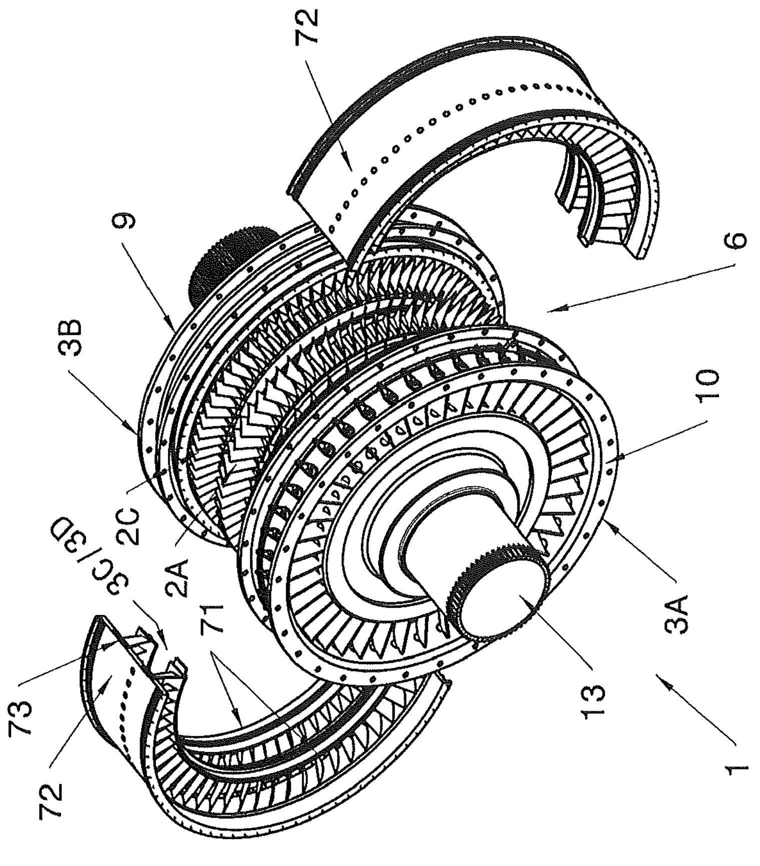
Figure 18:
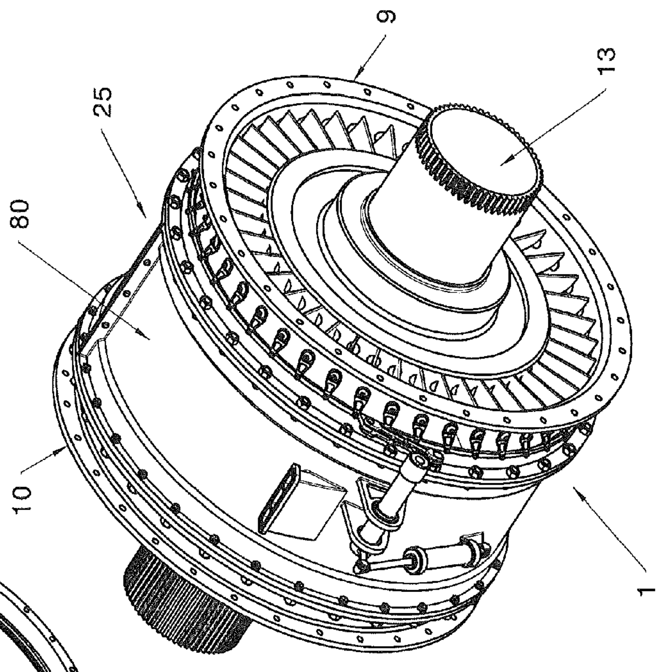
FIGS. 17 and 18 schematically illustrate the assembly and mounting of outer static casings over the center counter-rotating drum assembly illustrated in FIGS. 12-16, to complete assembly of the N-stage axial compressor with counter-rotating capability.
Figure 17:
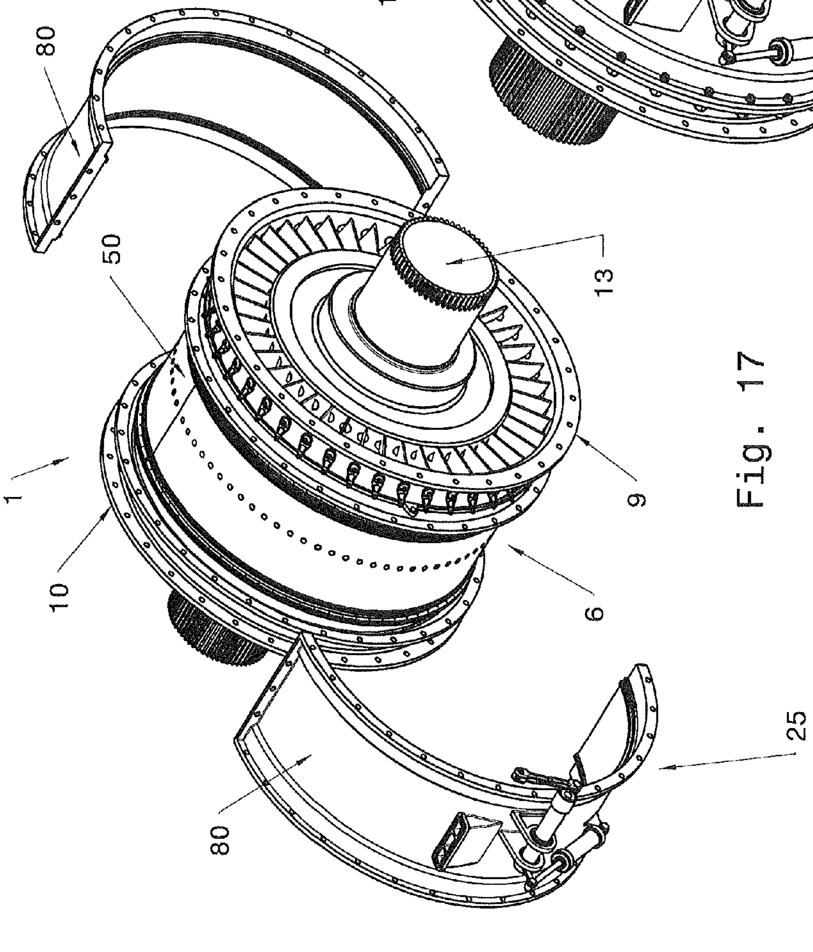

Thereafter, counter-rotating rotor blade assemblies 3C/3D are constructed and mounted over the compressor drum 50 of the axial compressor as illustrated in FIGS. 12-16. The counter-rotating rotor blade assemblies 3C/3D each will include a series of rotor blade structures 71 affixed to a counter-rotating case shell 72, such as by being inserted into grooves 73 into which the rotor blade structures can slide or otherwise be affixed, indicated in FIGS. 12-14. The counter-rotating casing shells, with their rotor blade assemblies mounted therein, are thereafter assembled over the compressor drum, with the counter-rotating rotor blade assemblies 3C/3D being inserted between the spaced rotor blade assemblies 2A-2C of the compressor drum, as indicated in FIG. 15, thus defining or forming a center counter-rotating drum 75 over the compressor drum. This counter-rotating drum further generally will be affixed to the forward and aft rotor blade assemblies 2A/2B to complete the assembly of the counter-rotating inner casing 6 of the axial compressor 1. Thereafter, opposed outer static casing shells 80, forming the static outer shroud 26 of the outer casing, generally will be mounted over the counter-rotating inner casing to complete the assembly of the axial compressor with counter-rotation, as illustrated in FIGS. 1, 2, 17 and 18.

In operation of the N-Stage axial compressor 1, the drive shaft 13 may be torqued by a turbine assembly associated with it or by a starter generator assembly to start the engine and cause the shaft 13 to rotate in a clockwise direction in FIGS. 1 and 2. The flanged sun gears in FIG. 1 and in FIG. 2 mounted on the drive shaft 13 rotate an assembly of planetary gears 20 in a counter-clockwise direction. The planetary gears 20 in turn rotate the fore and/or aft structural support casings 16/17 of the inner casing 6 counter-clockwise. This mechanism accordingly causes the rotor blades of the rotor blade assemblies 2 attached to shaft 13 to rotate in a direction opposite to the rotor blades of the rotor blade assemblies 3 attached to the inner casing. The rotation/counter-rotation of these rotor blade assemblies 2/3 can be controlled by adjusting the gear ratios of the planetary gear systems. Depending on operating conditions, the stagger angle of the inlet and outlet guide or stator vanes 10, 9 also can be varied to accommodate and/or enable changes in the aerodynamics thereof as needed or desired for the compressor operating conditions. Additionally, the direction of rotation of the shaft used in the above explanation need not be clockwise; it can also be adapted to counter clockwise rotating shaft machines, which in turn will rotate the planetary gear system in a clockwise direction.

Figure 19:
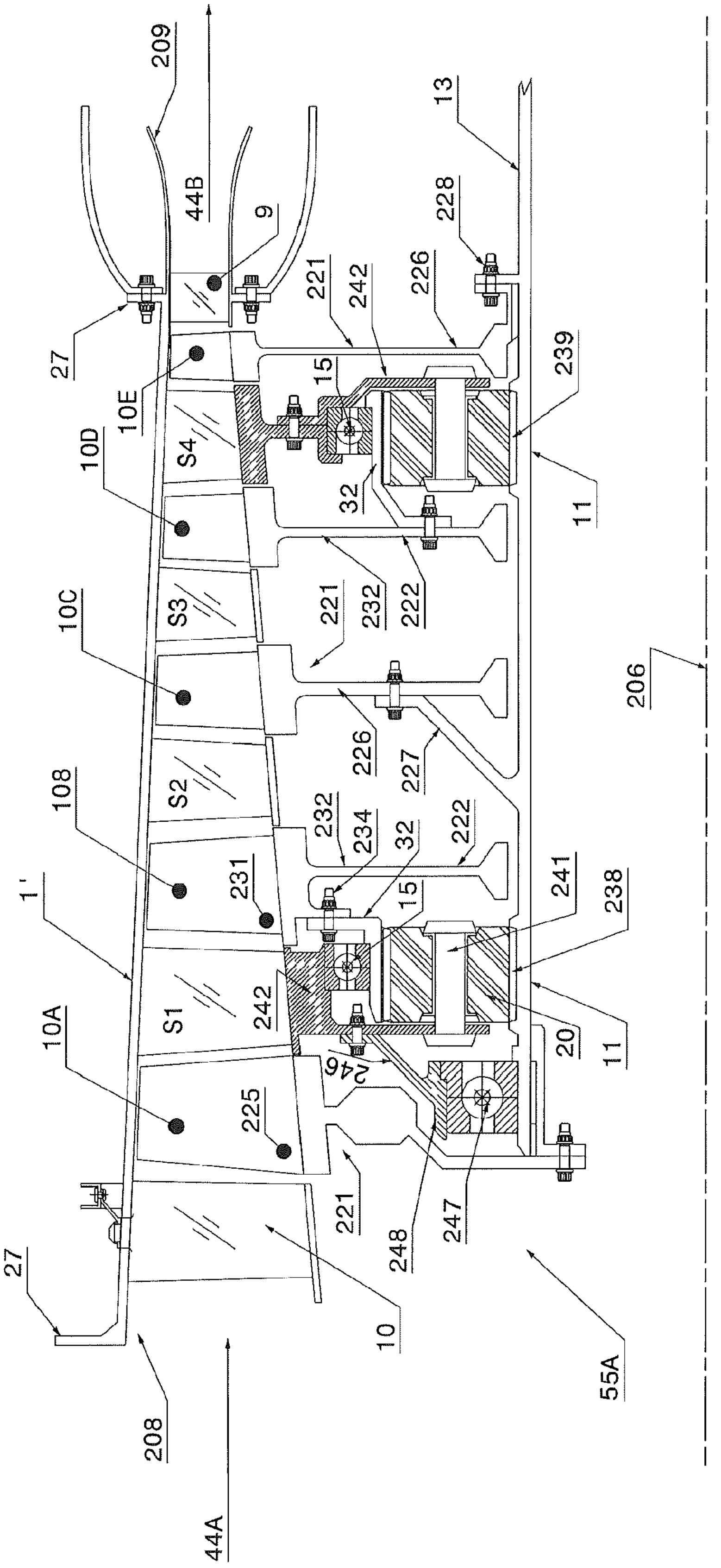
FIG. 19 is a side elevational, view taken in cross-section, of one embodiment of a five-stage compressor with sequential counter-rotation and stator vanes in an exemplary embodiment.
Figure 20:
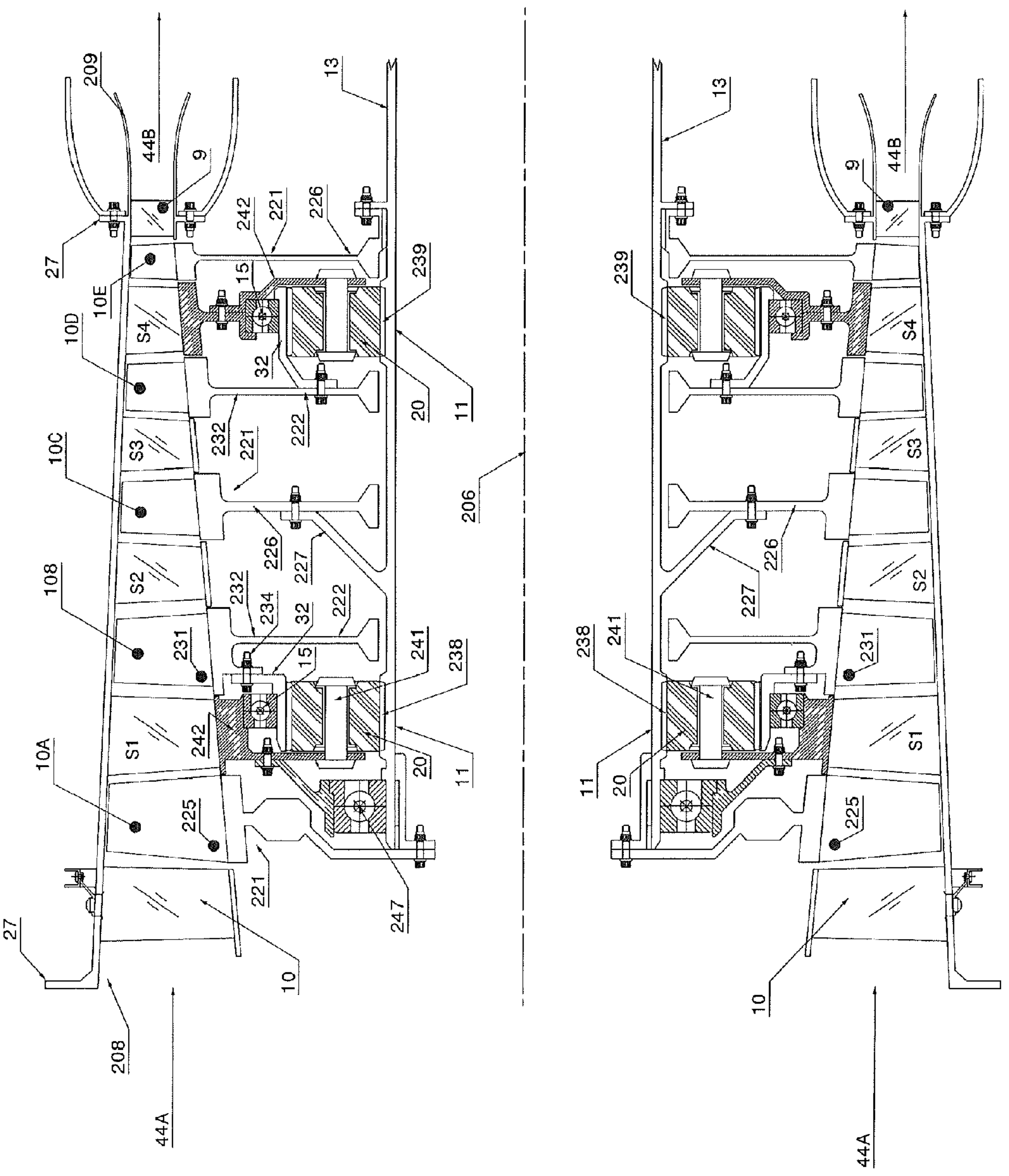
FIG. 20 is a side elevational, view taken in cross-section illustrating the upper and lower sections of the compressor of FIG. 19 on either side of the driveshaft in an exemplary embodiment.

In other embodiments, FIGS. 19-20 generally illustrate an axial compressor 55A with counter-rotation and the incorporation of stationary/stator vanes or airfoils. In the embodiments illustrated, a solution is presented for implementing sequential counter-rotation in a multi-stage axial compressor, here shown as a five-stage compressor 55A, and which, as noted, further incorporates a series of stator vanes S1-S4 as a part of the stages of the compressor, which stator vanes can help in the management of high tip Mach numbers and incidence angles generally associated with counter-rotation compressor systems. In the illustrated embodiments, the counter-rotation for the axial compressor 55A is achieved using a single driveshaft 13, typically being driven or torqued by a turbine (not shown) associated with the compressor as part of an engine, such as for aircraft.

As illustrated in FIGS. 19 and 20, the axial compressor 55A generally includes an elongated, tubular body 1' having a static outer casing or shell that surrounds and extends along the driveshaft 13 about a central axis 206. As indicated in FIG. 20, flow paths 44A and 44B are defined through the compressor on opposite sides of the driveshaft 13, with each of the flow paths extending from an inlet 208 along an inwardly tapering path to an outlet or discharge end 209, along which the flow of air moving along such pathways 44A and 44B is compressed by the axial compressor so as to increase the pressure thereof as the airflow passes through multiple stages 10A-10E of the compressor 55A.

The static case 1' of the compressor further typically includes fore and aft flanges 27 which can be mounted or formed with the compressor casing or shell. These fore and aft flanges 27 assist in the connection of the compressor to other engine components, such as an intermediate pressure compressor (IPC), diffuser/combustor and other engine components C, as will be understood by those skilled in the art. The flanges 27 further can connect and secure an inlet stator guide vane 10 and an outlet stator guide vane 9, respectively, at the fore (inlet) 208 and aft (outlet) ends 209 of the compressor. The inlet and outlet guide vanes generally will be substantially fixed in place and typically will be oriented at a desired stagger angle selected to meet desired operating conditions of the compressor, and it will be understood that such stagger angles for the inlet and outlet guide vanes further can be varied as needed depending upon the desired operating conditions of the compressor.

As further illustrated in FIGS. 19 and 20, a series of stator vanes S1, S2, S3 and S4, in addition to the inlet and outlet guide vanes 10/9, generally can be fixedly mounted to the static case 1' so as to likewise be in a static or fixed mounting. These stator vanes S1-S4 further are shown as being arranged between a first and second series of rotating and counter-rotating airfoil assemblies 221 and 222. For example, in the embodiment illustrated in FIGS. 19 and 20, each second or counter-rotating airfoil assembly 222 is arranged at spaced intervals from adjacent areas of the first, rotating assemblies 221, and is separated from the adjacent rotating airfoil assemblies by one of the stator vanes S1-S4. The stator vanes generally will be oriented at varying stagger angles as needed depending upon the operating conditions for the compressor, and defining multiple stages of the compressor 55A.

In the illustrated embodiments, the compressor driveshaft 13 generally will be connected directly to each of the first, rotating airfoil assemblies 221 so as to directly drive these first airfoil assemblies 221 in the same direction as the rotation of the driveshaft. For example, if the driveshaft is driven in a generally clockwise direction, the first, rotating airfoil assemblies 221 likewise will be driven in a clockwise direction, whereas if the driveshaft is rotated in a counter-clockwise direction, the first airfoil assemblies 221 generally will also be driven in a counter-clockwise direction. The second series or set of airfoil assemblies 222 are provided as counter-rotating airfoil assemblies, and will be rotated in an opposite direction to the first series or set of rotating airfoil assemblies 221 and the driveshaft 13, in response to the rotation of the driveshaft. This second series or set of counter-rotating airfoil assemblies 222 further can be rotated at different or varied speeds with respect to the first series of rotating airfoil assemblies 221.

As FIGS. 19 and 20 further illustrate, the rotating vane or airfoil assemblies 221 each generally include an airfoil blade or vane 225 arranged at a desired stagger angle and attached to or formed with an inwardly projecting support member or disk 226. Each of the inwardly projecting support members or disks 226 of the rotating airfoil assemblies 221 further can be attached either directly or via a connector leg 227 to the driveshaft 13, such as by fasteners 228, such as rivets, bolts, or by welding, etc. so as to be directly driven by the rotation of the driveshaft. For example, as indicated in FIGS. 19 and 20, the support members or disks 226 for the blades or vanes 225 of the rotating airfoil assemblies 221 can be attached via fasteners 228 such as rivets, bolts or other fastening means, as will be understood by those skilled in the art so as to affix the support disks directly to the driveshaft 13. Alternatively, the support disks 226 of the rotating airfoil assemblies 221 could be integrally formed with the driveshaft, such as by extrusion, or could be otherwise fixedly secured to the driveshaft by welding, etc.

As additionally shown in FIGS. 19 and 20, the second or counter-rotating airfoil assemblies 222 generally will be indirectly connected or linked to the driveshaft 13 by epicyclic gear assemblies 11 in order to drive the counter-rotating airfoil assemblies 222 in an opposite direction counter to the rotation of the driveshaft 13 and rotating airfoil assemblies 221. Each of the counter-rotating airfoil assemblies 222 can have a similar design and/or construction to that of the rotating airfoil assemblies 221, including an airfoil blade or vane 231, connected to an inwardly extending or projecting support member or disk 232. Generally, each of the counter-rotating airfoil assemblies further will include a ring gear 32 that can be attached directly to the support disks 232 for the airfoil blades 231, such as by fasteners 234, welding, etc., as indicated in FIG. 19, or alternatively can be indirectly attached to a support member or disk 232 of the airfoil assemblies by a secondary leg or support 32. Generally each of the ring gears 32 is received between a bearing 15 and a planetary gear 20 of their respective epicyclic gear assemblies 11.

As further illustrated in FIGS. 19-20 at points 238 and 239, the driveshaft 13 forms or includes a sun gear where the planetary gears 20 of each of the epicyclic gear assemblies 11 engage the driveshaft 13. Each of the planetary gears is shown as being rotatably mounted on a shaft 241, which is in turn connected to one of the stator vanes S1/S4 by load bearing/support members 242 mounted to a base of each of the stator vanes. The bearings 15 of each of the epicyclic gear assemblies 11 are mounted/received between the ring gears 32 and the load support members 242 of the stator vanes, with an additional bearing assembly, indicated at 247, being shown connected to the foremost stator vane S1 by a support leg 246 and having a bearing 247 that can be engaged between the driveshaft 13 and the distal end 48 of the support leg 246. The bearings 15 thus transfer thrust loading from the counter-rotating airfoil assembly disks 232 and the driveshaft 13, to the stator vanes S1 and S4, which in turn can transfer the thrust loads to the static compressor casing 1' and away from the rotating/counter-rotating airfoil assemblies.

In the embodiment illustrated in FIGS. 19 and 20, the epicyclic gear assemblies 11 of the counter-rotating airfoil assemblies 222 are illustrated as being arranged internally of the fore and aft stator vanes S1 and S4. This can create a difference in speed of rotation of the rotating and counter-rotating airfoil assemblies 221 and 222, whereby the rotating airfoil assemblies 221 are rotated at a faster rate than the counter-rotating airfoil assemblies 222. Alternatively, the epicyclic gear assemblies 11 can be arranged such that the driveshaft 13 can be connected to the ring gear 32, and the disk assemblies 232 can be connected to the sun gear at points 238 and 239. In such an embodiment, the counter rotating airfoil assemblies 222 can be caused to rotate faster than the rotating airfoil assemblies 221, allowing for flexibility in aerodynamic design.

As a result, the structure of the embodiments disclosed in FIGS. 19-20 provides for an axial compressor that incorporates sequential counter-rotation of selected airfoil blades/vanes, driven off a single driveshaft, with the facility of incorporating stator vanes that can assist in the management and control of high tip Mach numbers and incidence angles of the airflows passing through the compressor as can occur with such counter-rotating structures. The disclosed embodiments further provide greater flexibility to the design of the compressor to enable faster or slower counter-rotation as needed depending upon the design and operational requirements of the compressor and engine in which the compressor is employed. Accordingly, from an aerodynamic standpoint, the rotating and counter-rotating airfoil assemblies can be provided with their own speed or RPMs, enabling the custom designing of a more optimal aerodynamic operation of the compressor based upon desired/necessary performance requirements, while from a mechanical standpoint, the use of separate epicyclic gear assemblies driving each of the counter-rotating airfoil assemblies enables the counter-rotating and rotating airfoil assemblies to be decoupled such that if there is a problem with engine vibrations being transmitted through the compressor, such vibrations will not be transmitted to all the airfoil structures of the compressor.

The corresponding structures, materials, acts, and equivalents of all means plus function elements in any claims below are intended to include any structure, material, or acts for performing the function in combination with other claim elements as specifically claimed.

Those skilled in the art will appreciate that many modifications to the exemplary embodiments are possible without departing from the scope of the present invention. In addition, it is possible to use some of the features of the embodiments disclosed without the corresponding use of the other features. Accordingly, the foregoing description of the exemplary embodiments is provided for the purpose of illustrating the principles of the invention, and not in limitation thereof, since the scope of the invention is defined solely by the appended claims.

The invention claimed is:

1. A multi-stage axial compressor comprising:

a driveshaft;

a first series of rotor blade assemblies mounted on and rotating with the drive shaft, each rotor blade assembly comprising a rotating stage of the multi-stage axial compressor;

a second series of rotor blade assemblies positioned along the drive shaft, each rotor blade assembly comprising a counter-rotating stage of the multi-stage axial compressor;

a first planetary gear assembly mounted along the driveshaft and operatively connecting the second series of rotor blade assemblies to the drive shaft so that the second series of rotor blade assemblies are in communication with the first series of rotor blade assemblies; and a second planetary gear assembly mounted along the driveshaft at a position spaced apart from the first planetary gear assembly along a length of the driveshaft, wherein the first and second planetary gear assemblies define a dual drive transmission that enables counter-rotation between the first and second series of rotor blade assemblies.

2. The multi-stage axial compressor of claim 1 further comprising a counter-rotating inner casing connected to the second series of rotor blade assemblies.

3. The multi-stage axial compressor of claim 2 further comprising inlet and outlet axial guide vanes mounted on the axial compressor, the inlet guide vanes mounted at a fore end of the axial compressor preceding the first and second set of rotor blade assemblies, the outlet guide vanes mounted at an aft end of the axial compressor following the first and second set of rotor blade assemblies.

4. The multi-stage axial compressor of claim 3, further comprising:

corresponding inlet and outlet structural support casings respectively mounted adjacent to the inlet and outlet guide vanes, the inlet and outlet structural support casings at least partially supporting the counter-rotating inner casing.

5. The multi-stage axial compressor of claim 4, wherein the structural support casings comprise single cast disks, each disk having a plurality of spokes.

6. A multi-stage axial compressor, comprising:

a driveshaft;

a first series of rotor blade assemblies mounted on and rotating with the drive shaft, each rotor blade assembly comprising a rotating stage of the multi-stage axial compressor;

a second series of rotor blade assemblies mounted on the drive shaft, each rotor blade assembly comprising a counter-rotating stage of the multi-stage axial compressor and connected to at least one planetary gear assembly operable to cause counter-rotation of the second series of rotor blade assemblies;

a counter-rotating inner casing connected to the second series of rotor blade assemblies;

inlet and outlet axial guide vanes mounted on the axial compressor, the inlet guide vanes mounted at a fore end of the axial compressor preceding the first and second set of rotor blade assemblies, the outlet guide vanes mounted at an aft end of the axial compressor following the first and second set of rotor blade assemblies; and inlet and outlet structural support casings respectively mounted adjacent to the inlet and outlet guide vanes, the structural support casings supporting the rotating inner casing, wherein the structural support casings comprise single cast disks, each disk comprising a plurality of spokes that are connected to the inner casing by fasteners and terminate at an inner frame member connected to the planetary gear assembly.

7. The multi-stage axial compressor of claim 6 wherein the inner frame member includes a ring gear for engaging a planetary gear of the planetary gear assembly.

8. The multi-stage axial compressor of claim 2 further comprising a stationary outer casing covering and substantially sealing the inner casing.

9. The multi-stage axial compressor of claim 8 wherein the outer casing includes stationary inlet guide vanes mounted at an inlet end of the axial compressor, and outlet guide vanes mounted at an outlet end of the axial compressor.

10. The multi-stage axial compressor of claim 9 wherein the outer casing comprises an outer shroud for covering the rotating inner casing, with a spacing between the inner casing and the outer casing maintained by a plurality of bearings.

11. The multi-stage axial compressor of claim 10 wherein the outer shroud is connected to the inlet and outlet guide vanes by fasteners.

12. The multi-stage axial compressor of claim 8 wherein the outer casing further comprises a plurality of support members that are supported on the driveshaft by a plurality of bearing assemblies which enable rotation of the driveshaft while providing load support for the outer casing.

13. The multi-stage axial compressor of claim 2 wherein the first and second series of rotor blade assemblies are mounted in a spaced alternating series about a hub that is adapted to fit over and be supported by the driveshaft.

14. The multi-stage axial compressor of claim 13 wherein the first series of rotor blade assemblies is mounted on the driveshaft so as to rotate in the direction of the driveshaft, and second series of rotor blade assemblies are connected to and adapted to rotate in an opposite direction with the counter rotation of the inner casing.

15. The multi-stage axial compressor of claim 14 further comprising a plurality of flanged sun gears mounted on the driveshaft to rotate the planetary gear assembly in a direction opposite to the direction of rotation of the driveshaft.

16. A method for assembling an axial compressor with counter-rotation of a plurality of rotor blade assemblies comprising:

mounting a plurality of hubs over a compressor driveshaft between fore and aft mounting collars;

mounting a plurality of spaced apart rotating rotor blade assemblies on the plurality of hubs between the fore and aft mounting collars to form a compressor drum;

mounting a sun gear on the driveshaft at a fore end and at an aft end of the compressor drum, each sun gear including a series of inwardly facing keyed passages of locking recesses or splines adapted to receive projecting locking members or keys or splines of the fore and aft mounting collars;

assembling forward and aft structural support casings including at least one planetary gear assembly;

mounting the forward and aft structural support casings on the driveshaft with bearings inserted between the forward and aft support casings and the fore and aft ends of the compressor drum;

mounting a plurality of counter-rotating rotor blade assemblies over the compressor drum, each counter rotating blade assembly including a series of rotor blade structures affixed to a counter-rotating case shell, the counter rotating blade assemblies being inserted between the spaced rotating rotor blade assemblies to form a center counter-rotating drum over the compressor drum;

affixing the counter-rotating drum to a fore rotor blade assembly and an aft rotor blade assembly to form an assembled counter-rotating inner casing of the axial compressor;

forming a static outer shroud of the outer casing by assembling opposed outer static casing shells; and mounting the static outer shroud over the counter-rotating inner casing.

17. The method for assembling an axial compressor with counter-rotation of claim 16 wherein assembling forward and aft structural support casings comprises:

assembling a series of planetary gears to a static case of an inlet guide vane and an outlet guide vane;

assembling a bearing and a ring gear over the planetary gears, with the teeth of the ring gear in operative engagement with the teeth of the planetary gear; and aligning and assembling a counter-rotating blade assembly of the counter-rotating inner casing onto each ring gear.

18. The method for assembling an axial compressor with counter-rotation of claim 17 further comprising aligning and engaging the corresponding planetary gear of the forward and aft structural support casings with the sun gears mounted to the fore and aft ends of the compressor drum.

* * * * *